United States Patent
Kocher et al.

(10) Patent No.: US 11,598,754 B2
(45) Date of Patent: Mar. 7, 2023

(54) METHOD AND SYSTEM FOR DETERMINING PROCESS PROPERTIES USING ACTIVE ACOUSTIC SPECTROSCOPY

(71) Applicant: ACOSENSE AB, Gothenburg (SE)

(72) Inventors: Johannes Kocher, Torslanda (SE); Luís Reina, Hisings Backa (SE)

(73) Assignee: ACOSENSE AB, Gothenburg (SE)

( * ) Notice: Subject to any disclaimer, the term of this patent is extended or adjusted under 35 U.S.C. 154(b) by 35 days.

(21) Appl. No.: 16/764,254

(22) PCT Filed: Nov. 26, 2018

(86) PCT No.: PCT/SE2018/051216
§ 371 (c)(1),
(2) Date: May 14, 2020

(87) PCT Pub. No.: WO2019/103689
PCT Pub. Date: May 31, 2019

(65) Prior Publication Data
US 2020/0278328 A1 Sep. 3, 2020

(30) Foreign Application Priority Data
Nov. 27, 2017 (SE) .................... 1751455-5

(51) Int. Cl.
*G01N 29/46* (2006.01)
*G01N 29/032* (2006.01)
(Continued)

(52) U.S. Cl.
CPC ........... *G01N 29/46* (2013.01); *G01N 29/032* (2013.01); *G01N 29/222* (2013.01); *G01N 29/4454* (2013.01)

(58) Field of Classification Search
CPC .... G01N 29/46; G01N 29/032; G01N 29/222; G01N 29/4454; G01N 29/12;
(Continued)

(56) References Cited

U.S. PATENT DOCUMENTS

| 9,772,311 B2 | 9/2017 | Liljenberg et al. |
| 2010/0058867 A1 | 3/2010 | Ueno et al. |

(Continued)

FOREIGN PATENT DOCUMENTS

| CN | 101460840 A | 6/2009 |
| CN | 102621221 A | 8/2012 |

(Continued)

OTHER PUBLICATIONS

Broek, Van Den W H A M et al., "Application of a Spectroscopic Infrared Focal Plane Array Sensor for On-Line Identification of Plastic Waste," Applied Spectroscopy, vol. 51, No. 6, Jun. 1, 1997, pp. 856-865.

(Continued)

*Primary Examiner* — Tarun Sinha
(74) *Attorney, Agent, or Firm* — RMCK Law Group, PLC (57) ABSTRACT

There is provided a method for determining material properties in an active acoustic spectroscopy system, the method comprising: acquiring a multidimensional acoustic spectrum from a material in a container using acoustic spectroscopy; reducing the dimensionality of the acoustic spectrum using a mathematical dimensionality reduction method, thereby forming a reduced acoustic spectrum describing a material state; and determining if the material state belongs to a predetermined material state cluster. There is also provided a system for performing the described method.

20 Claims, 4 Drawing Sheets

(51) Int. Cl.
*G01N 29/22* (2006.01)
*G01N 29/44* (2006.01)

(58) Field of Classification Search
CPC ............ G01N 29/348; G01N 29/4481; G01N 29/036; G01N 29/4472; G01N 29/44; G01N 2291/102
See application file for complete search history.

(56) References Cited

U.S. PATENT DOCUMENTS

| | | | |
|---|---|---|---|
| 2012/0143082 A1 | 6/2012 | Notingher et al. | |
| 2013/0054603 A1 | 2/2013 | Birdwell et al. | |
| 2014/0060188 A1* | 3/2014 | Singh | G01N 29/4436 73/579 |
| 2016/0369623 A1* | 12/2016 | Ahmad | G01N 29/02 |
| 2016/0369624 A1 | 12/2016 | Ahmad et al. | |
| 2017/0089767 A1 | 3/2017 | Desilva | |

FOREIGN PATENT DOCUMENTS

| | | | | |
|---|---|---|---|---|
| CN | 103645249 A | | 3/2014 | |
| CN | 104597124 A | | 5/2015 | |
| CN | 104713714 A | | 6/2015 | |
| CN | 107274105 A | | 10/2017 | |
| CN | 107328868 A | | 11/2017 | |
| EP | 1302764 A1 | * | 4/2003 | ......... G01N 15/1456 |
| EP | 1302764 A1 | | 4/2003 | |
| JP | 2003232759 A | | 8/2003 | |
| JP | 2012187139 A | | 10/2012 | |
| WO | 2011026638 A1 | | 3/2011 | |
| WO | 2013119177 A1 | | 8/2013 | |

OTHER PUBLICATIONS

Extended European Search Report dated Jul. 5, 2021 for EP Application No. 18880561.8, 8 pages.
Kamerzell, T. et al., "Protein-excipient interactions: Mechanisms and biophysical characterization applied to protein formulation development," Advanced Drug Delivery Reviews, vol. 63, No. 13, Jul. 26, 2011, pp. 1118-1159.
Liu, S. et al., "Defects Pattern Recognition for Flip Chip Solder Joint Quality Inspection with Laser Ulliasound and Interferometer," Electronic Components and Technology Conference, 2002, pp. 1491-1496.
PCT International Search Report and Written Opinion dated Jan. 29, 2019 for International Application No. PCT/SE2018/051216, 12 pages.
Penza, M. et al., "Application of principal component analysis and artificial neural networks to recognize the individual VOCs of methanol/2-propanol in a binary mixture by SAW multi-sensor array," Sensors and Actuators B 89 (2003), pp. 269-284.
Rines, J.E.B. et al., "Thin layers and species-specific characterization of the phytoplankton community in Monterey Bay, California, USA," Continental Shelf Research 30 (2010), pp. 66-80.
Swedish Search Report dated Jun. 27, 2018 for Patent Application No. 1751455-5, 3 pages.
English Translation of Chinese Office Action and Search Report dated Oct. 31, 2022 for Chinese Application No. 201880076136.7, 14 pages.

* cited by examiner

METHOD AND SYSTEM FOR DETERMINING PROCESS PROPERTIES USING ACTIVE ACOUSTIC SPECTROSCOPY

CROSS-REFERENCE TO RELATED APPLICATIONS

This application is a 371 U.S. National Stage of International Application No. PCT/SE2018/051216, filed Nov. 26, 2018, which claims priority to Swedish Patent Application No. 1751455-5, filed Nov. 27, 2017. The disclosures of each of the above applications are incorporated herein by reference in their entirety.

FIELD OF THE INVENTION

The present invention relates to an active acoustic spectroscopy system and to a method for determining material properties in an active acoustic spectroscopy system.

BACKGROUND OF THE INVENTION

In the process industry it is many times of outmost importance to monitor and control the properties of various materials involved in a process. For fluid processes, control measurements can be performed where individual instruments are employed for determining different properties of the fluid, or laboratory samples can be gathered for further analysis to determine properties of the analyzed material.

However, such analysis gives a limited description and not an integral description of the entire fluid. Furthermore, these analysis tools can be both costly and time consuming and it is desirable to simplify material characterization and process control in various processes.

Moreover, there are stages where a process may be semi-continuous and parameters need to be changed to achieve a specific quality of the processed material, i.e. the "right quality". The definition of "right quality" is often a description given by a combination of single or multiple properties related to specific quality parameters. In such a process, it is desired to save energy and raw materials by changing the quality parameters in an optimized fashion, i.e. to switch between different predetermined material properties in the fastest possible way. Moreover, in some processes it is more important to be able to repeatedly identify a specific process state than to know the specific properties of the process.

Active acoustic spectroscopy is a measurement technique used to analyze fluids inside of a container or containment such as a pipe or a vat. The technique is currently mainly used in the process industry. The technique requires small sensors with high precision in order achieve measurements with sufficient quality in the process industry. Moreover, by using active acoustic spectroscopy and range of properties of a material can be determined in only one measurement.

Accordingly, active acoustic spectroscopy addresses some of the issues mentioned above. However, active acoustic spectroscopy provides measurement results which are multi dimensional and includes complex data. In many cases, data processing and manual handling of the measurement results is required for deriving useful information describing material and process properties.

In view of the above, it is desirable to increase the accessibility to active acoustic spectroscopy as a measurement tool usable in a wide range of processes.

SUMMARY

In view of above-mentioned and other drawbacks of the prior art, it is an object of the present invention to provide an improved method for determining material properties in an active acoustic spectroscopy system.

According to a first aspect of the invention, there is provided a method for determining material properties in an active acoustic spectroscopy system. The method comprises: acquiring a multi dimensional acoustic spectrum from a material in a container using acoustic spectroscopy; reducing the dimensionality of the acoustic spectrum using a mathematical dimensionality reduction method, thereby, forming a reduced acoustic spectrum describing a material state; and determining if the material state belongs to a predetermined material state cluster.

The material may be a fluid or solid material and the container may be a pipe, a vat or the like. The fluid may be a liquid or a gas. Thereby, an acoustic spectrum can be acquired from a moving or stationary material such as a moving fluid in a pipe as well as from a stationary fluid, solid or semi-solid material in a container. Moreover, the term material does not only refer to a single material species. Instead, the term material should in the present context be considered to include mixtures, solutions, compounds, agglomerations and any other combination consisting of a plurality of different components in different phases.

Herein, a material state can be seen as representative of a material, i.e. a fluid or solid or a combination thereof, having a certain combination of material properties.

A fluid material in a pipe may for example be evaluated at different locations of the pipe or at different stages of a process. The described method may also be used in a container during a process where the material properties are monitored during the process. In some applications, it may be important to monitor the material properties to ensure that they do not change, and in other applications a change in material properties may be monitored to ensure that the change progresses in a controlled and expected manner. Different material states occurring during a selected process may also be referred to as process states. It is thus understood that one specific combination of material properties, i.e. a material state or a process state, yields substantially the same acoustic spectrum for repeated measurements, and that the specific combination of material properties thus should be described by one material state, thereby providing a high repeatability. The described method may also be used for example in a batch container where the material properties vary through time.

The present invention is based on the realization that a complex multidimensional spectrum acquired by performing active acoustic spectroscopy can be simplified by first reducing the dimensionality of the spectrum followed by clustering where it is determined if the reduced spectrum belongs to a predetermined cluster of reduced spectrums. Thereby, a simplified method of representing different states of a material which may have a complex relation between different properties is provided.

A material state cluster can be considered to describe a plurality of material states which are close to each other in the representation determined by the selected reduced dimensionality. A material state cluster may also be seen, for example, as a material "quality". The described method may for example be employed in a process industry. In a process where many different qualities can be achieved and where different qualities may be required at different points in time, the material state clustering can aid an operator of the process in controlling the process to efficiently identify and reach a specific quality.

According to one embodiment of the invention, the method may further comprise defining a plurality of predetermined clusters based on a plurality of material states using a machine learning method. Thereby, the method and active spectroscopy system may be employed in a process without having any prior knowledge of the properties of the process or of the materials involved. By means of a machine learning algorithm, the material state clusters can be defined over time. The machine learning method can thereby be used to improve the controllability and predictability of an industrial process by means of the clustering performed by the machine learning method.

Moreover, the method may include defining new clusters as the process goes on and evolves over time, potentially defining a new cluster identifying a new material quality in the process. Accordingly, the spectroscopy system may be actively self learning as clusters are redefined as the process goes along.

According to one embodiment of the invention, the mathematical dimensionality reduction method may be selected from the group comprising: principal component analysis, wavelet transformation, neural networks, isomap and multidimensional scaling. The main purpose of the dimensionality reduction method can here be seen as simplifying a complex data representation while maintaining as much information as possible in the reduced data representation.

According to one embodiment of the invention, the mathematical dimensionality reduction method to be used can be selected based on a quality measure of a resulting material state resulting from a respective mathematical dimensionality reduction method. Using a selected reduction method for a set of acquired acoustic spectrums followed by clustering will lead to a certain set of clusters. Based on the clustering, a quality measure of a material state can be determined in relation to the specific clustering. Accordingly, using a different reduction method will give rise to a different distribution of the clusters. Thereby, it is advantageous to employ several different reduction methods on the same set of acoustic spectrum data to determine which of the resulting cluster distribution exhibits the highest quality measure, based on the material states.

According to one embodiment of the invention, the quality measure may be based on at least one of: a distance between selected data points representing material states; a radius of a resulting cluster; and number of data points within a certain radius. The distance between selected data points representing material states can for example be used to determine if material states which are known to be the same or similar end up sufficiently close together. It may also be required that a number of data points known to represent similar material states should also be found within a certain radius to fulfill quality requirements.

According to one embodiment of the invention, the reduced acoustic spectrum may be a two-dimensional data point. Thus, the dimensionality of the multi-dimensional acoustic spectrum has been reduced to two dimensions. A two dimensional representation of a material state provides for easy graphical representation and interpretation by a process operator. For some processes and applications, a two-dimensional acoustic spectrum may be sufficient for describing the relevant process states or material state clusters. However, for other processes, a higher dimensionality may be required for properly determining different material state clusters. Accordingly, the reduced acoustic spectrum may in principle have any dimensionality lower than the dimensionality of the original acoustic spectrum. The required dimensionality of the acoustic spectrum for representing the different material state clusters can for example be determined empirically. Thereby, the above discussed distance between data points and radius of clusters may defined on two or more dimensions.

According to another embodiment of the invention, the method may further comprise determining an optimal path between two different and separate predetermined material state clusters. Since a material state cluster may represent a certain material quality, it may also be desirable to control the process change, i.e. the transition, between different qualities in the most efficient manner. Thereby, the optimal paths between material state clusters can be defined so that the process can be monitored and controlled to follow the predetermined path from a first material state cluster to a second material state cluster.

According to one embodiment of the invention, determining an optimal path between two different and separate predetermined material state clusters may comprise optimizing a path based on an estimated time required to transition from a first material state cluster to a second material state cluster. This can be advantageous in applications where it is important to control a process to move between different process states, i.e. different material state clusters, as fast as possible. In a continuous process it may also be desirable to change from one material quality to another as quickly as possible in order to minimize waste during the transition. An example can be a paper manufacturing process where the quality of pulp is changed in a transition from a darker paper to a lighter or white paper.

According to one embodiment of the invention, determining an optimal path between two different and separate predetermined material state clusters may comprise optimizing a path based on an estimated energy required to transition from a first material state cluster to a second material state cluster. This may be advantageous in a process where energy consumption is important, and by controlling the transition between two clusters representing process states to minimize energy consumption, the overall energy efficiency of the process can be improved. There may also be applications where the energy consumption of another tool in the process depends on the material quality, such as if the material or a component of the material is provided by a grinder or the like.

Whether to optimize a transition between two process states based on time or based on energy consumption can either be controlled manually by an operator or it can be a setting in an automated control method. It can also be the case that it is desirable to optimize the time for some transitions and the energy for other transitions in a process, or the transition between two material state clusters can be controlled based on a combination of time and energy efficiency. Moreover, the optimization may involve machine learning so that the optimization process can be improved based on previously performed transitions.

According to one embodiment of the invention, the method may further comprise: determining that a process is transitioning from a first material state cluster to a second material state cluster; determining a transition velocity for the process; and comparing the determined transition velocity with a predetermined estimated transition velocity from a first material state cluster to a second material state cluster. A transition velocity which is higher than a predetermined transition velocity threshold value may for example result in an overshoot so that it takes a longer time to reach a steady process state even though the transition velocity as such is high. Accordingly, it is desirable to control the transition velocity between two material state clusters according to predetermined parameters to ensure that the transition speed is not too high.

According to one embodiment of the invention, if the material state does not belong to a predetermined material state cluster, the method may further comprise determining if the material state is located on a path between two predetermined material state clusters. Thereby, if it is observed that the material states changes such that a current material state no longer can be attributed to a predetermined material state cluster, it can be determined if the material or process is on a path towards a different material state cluster or if it is drifting unexpectedly. Consequently, appropriate actions can be taken depending on the nature of the deviation from the predetermined material state cluster.

According to one embodiment of the invention, the method may further comprise: acquiring a first set of correlated process control parameters influencing a material state; and based on the process control parameters and a current material state, determining if the material state is expected to move towards a first predetermined material state cluster. A given set of process control parameters can be assumed to result in a given set of material properties, thereby predicting a material state cluster. Thereby, not only the acquired acoustic spectrum but also control parameters of the process can be used to evaluate if a selected material state cluster will be reached. Thereby, a process can be both monitored and controlled such that a selected material state cluster can be reached.

According to one embodiment of the invention, the method may further comprise: acquiring a first set of correlated process control parameters influencing the material state; based on the process control parameters and a current material state, determining if the material state is expected to correspond to a first predetermined material state cluster; acquiring a second set of correlated process control parameters influencing the material state; and based on the second set of process control parameters and a current material state, determining if the material state is expected to move towards a second predetermined material state cluster, different from the first predetermined material state cluster. Accordingly, the specific movement from a first material state cluster towards a second material state cluster can be monitored and controlled. Moreover, it is also possible to determine and predict if and how an expected path between e.g. the first and the second material state cluster will change over time while varying the process control parameters.

According to one embodiment of the invention the method may further comprise, if the material state does not belong to a predetermined material state cluster, determining that the material state is an undefined material state. If an undefined material state is observed, an alert may be triggered such that the process can be corrected if required. Such a correction may be performed automatically by adjusting predetermined process control parameters or it may be performed manually by an operator. When using a machine learning algorithms and based on previous material state clusters, the method may identify if a material state not belonging to a material state cluster is a new regular material state or this is a material state similar to a state that has previously triggered an alarm.

According to one embodiment of the invention, the method may further comprise, if a predetermined number of consecutively determined material states are located within one and the same predetermined material state cluster, determining that the monitored process is in a steady state. This is equivalent with a process being in the same state cluster for a predetermined period of time, since the time between consecutive acoustic spectroscopy measurements can be considered to be known.

According to one embodiment of the invention, the method may further comprise, if a material state is not within a selected material state cluster, estimating a time to reach the selected material state cluster based on a plurality of previously determined material states. Accordingly, an expected path can be determined, e.g. by extrapolation, based on previous measurements and by observing how fast the material states move towards the selected material state cluster. It is also possible to use a predetermined mathematical model for estimating future material states based on previously acquired material states.

According to one embodiment of the invention, the method may further comprise, based on a plurality of reduced acoustic spectrums describing a plurality of material states, defining at least one material state cluster from the plurality of reduced acoustic spectrums. Thereby, the one or more clusters can be defined based on previously determined states. There are several different ways that the material state clusters can be determined. The material state clusters can be defined manually by matching the material states with known process states determined by other means, such as conventional analysis tools and measurements. It is also possible to automatically define material state clusters using a clustering algorithm. Examples of such clustering algorithms include DBSCAN (Density Based Spatial Clustering of Applications with Noise), ward-clustering and using a support vector machine. The clustering tools can for example operate based on supervised learning.

According to a second aspect of the invention, there is provided a method for determining material properties in an active acoustic spectroscopy system. The method comprises: acquiring a plurality of multi dimensional acoustic spectrums from a material in a container using acoustic spectroscopy; reducing the dimensionality of the acoustic spectrums using a mathematical dimensionality reduction method, thereby forming a plurality of reduced acoustic spectrums describing a respective plurality of material states; using a machine learning method, evaluating the plurality of material states to define at least one material state cluster.

Accordingly, the described method can be used to define material states clusters in a continuous process without interrupting the process and without requiring any prior knowledge of the process.

The method may further comprise using a machine learning method to evaluate each newly acquired material state to determine if the defined at least one material state cluster is to be modified based on the newly acquired material state. Thereby, a representation of the process and different process states in terms of material state clusters can be continuously updated in order to improve the control of the process. A newly identified material state cluster may require verification before being used in an overall process control system. Such verification may for example be performed by a process operator which is prompted to review the new material state cluster, or verification may be performed by comparing with a local or remote database comprising possible material state clusters.

Additional effects and features of the second aspect of the invention are largely analogous to those described above in connection with the first aspect of the invention.

According to a third aspect of the invention, there is provided an active acoustic spectroscopy system comprising: an acoustic transmitter arranged to emit an acoustic signal into a material in a container; an acoustic receiver arranged to receive the acoustic signal having been affected by the material; and a control unit connected to each of the acoustic transmitter and the acoustic receiver. The control unit is configured to acquire a multi dimensional acoustic spectrum from a material in a container using acoustic spectroscopy; reduce the dimensionality of the acoustic spectrum, forming a reduced acoustic spectrum describing a material state; and determine if the material state belongs to a predetermined material state cluster.

The acoustic transmitter and the acoustic receiver may for example be arranged on opposing sides of a container such as a pipe, whereby the transmitter emits an acoustic signal into the pipe. The acoustic signal will propagate through the material being located in the pipe before reaching the transmitter. Moreover, the acoustic signal will also propagate in the walls of the container, where the propagation is influenced by the material properties of the container wall. The acoustic signal reaching the receiver will thereby have been influenced by the material in the container both directly as a result of the signal propagation through the material and indirectly as a result of the signal propagation in the side walls of the container being in contact with the material.

According to one embodiment of the invention, the system may further comprise a force sensor arranged between the acoustic transmitter and the container. Thereby, it is possible to more accurately determine properties of the acoustic signal being transmitted into the container, since the properties of the acoustic signal are not only determined by the acoustic transmitter but also by the properties of the container to which the acoustic transmitter is connected.

Additional effects and features of the third aspect of the invention are largely analogous to those described above in connection with the first and second aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the method for determining material properties in an active acoustic spectroscopy system and a system according to the present invention are mainly described with reference to an active acoustic spectroscopy system arranged to determine the properties of a fluid material in a pipe. However, the described method and system may be provided in many different configurations to determine material properties in various containers.

Figure 1:
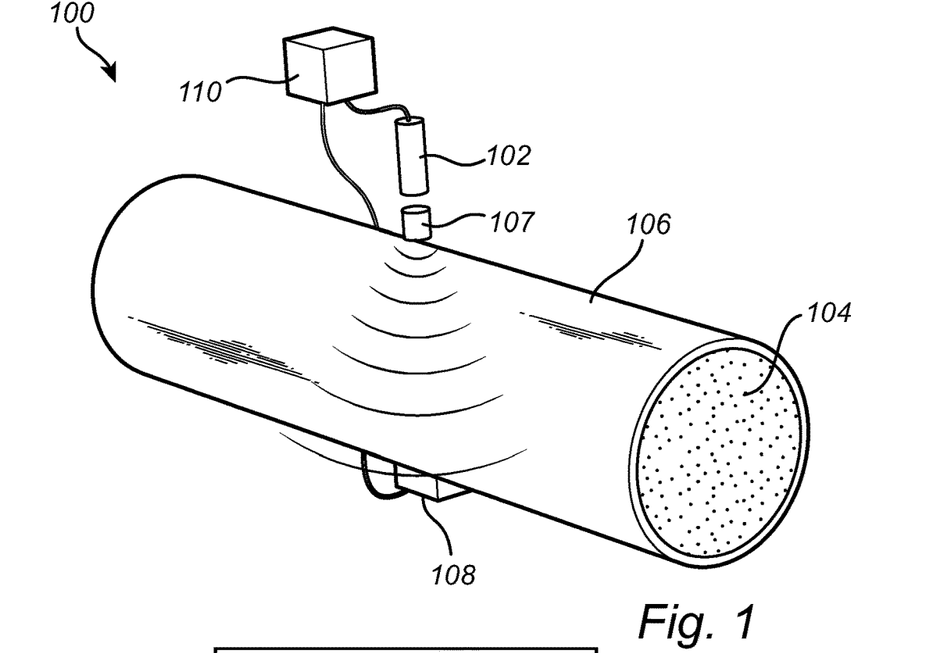
FIG. 1 schematically illustrates an active acoustic spectroscopy system according to an embodiment of the invention.

FIG. 1 schematically illustrates an active acoustic spectroscopy system 100 comprising an acoustic transmitter 102 arranged to emit an acoustic signal into a material 104 in a container 106, here in the form of a pipe 106. A force sensor 107 is arranged between the acoustic transmitter and the pipe to more accurately determine properties of the acoustic signal being transmitted into the container 106. The force sensor 107 is configured such that the force provided to the force sensor 107 from the acoustic transmitter 102 is transferred through the force sensor 107 and to the container 106. However, it should be noted that the force sensor is optional in the described system 100. Moreover, FIG. 1 illustrates the transmitter 102 and the force sensor 107 in an exploded view. In practice, the transmitter 102 is mechanically connected to the force sensor 107 which in turn is attached to the pipe 106.

The system further comprises an acoustic receiver 108 arranged to receive the acoustic signal having been affected by the material. In the present illustration, the acoustic receiver 108 is arranged opposite to the acoustic transmitter 102 so that the acoustic signal travels the maximum possible distance through the material 104. However, it is not a requirement that the acoustic receiver 108 is arranged opposite of the acoustic transmitter 102, the acoustic receiver 108 may equally well be arranged in other locations on the container.

The active acoustic spectroscopy system 100 further comprises a control unit 110 connected to each of the acoustic transmitter 102 and the acoustic receiver 108. The control unit 110 may include a microprocessor, microcontroller, programmable digital signal processor or another programmable device. The control unit 110 may also, or instead, include an application specific integrated circuit, a programmable gate array or programmable array logic, a programmable logic device, a digital signal processor, or any given unit that follows the von Neumann model. Where the control unit 110 includes a programmable device such as the microprocessor, microcontroller or programmable digital signal processor mentioned above, the processor may further include computer executable code that controls operation of the programmable device.

Figure 2:
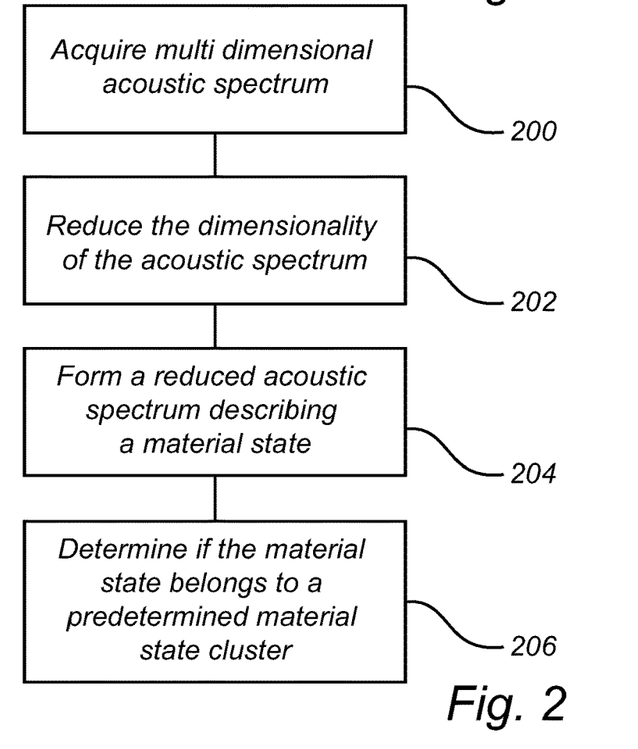
FIG. 2 is a flow chart outlining the general steps of a method according to an embodiment of the invention.

The control unit is configured to perform a method according to an embodiment of the invention, where the method steps are illustrated by the flow chart of FIG. 2. Accordingly, the control unit 110 is configured to acquire 200 a multi dimensional acoustic spectrum from a material in a container using acoustic spectroscopy; reduce 202 the dimensionality of the acoustic spectrum using a mathematical dimensionality reduction method to form 204 a reduced acoustic spectrum describing a material state; and determine 206 if the material state belongs to a predetermined material state cluster.

In the following, an example of the general methodology of using active acoustic spectroscopy will be described. A measurement signal in the form of a frequency spectrum comprising frequencies between 0-20 kHz having a predetermined amplitude is emitted into the fluid 104 by the emitter 102. The measurement signal may be a continuous signal comprising all of the selected frequencies, where the amplitude for each frequency may be selected arbitrarily.

The signal may also be provided in the form of a frequency sweep where the predetermined amplitude may be kept constant while varying the frequency of the signal. Alternatively, the amplitude of the signal source may be modulated during the frequency sweep. The transmitted signal is received by the acoustic receiver 108 and the received signal will differ from the emitted signal as a result of interaction with the fluid through which the signal propagates. The acoustic receiver 108 may, for example, be a piezoelectric sensor, and vibrations in the wall of the pipe may alternately compress and expand the piezoelectric sensor, resulting in a time-varying voltage output from the sensor 108. The time-varying voltage output is digitized, resulting in a vector of voltage values.

Next, the frequency spectrum of the signal output from the sensor 108 is acquired, for example using FFT on the vector of voltage values. The result of the FFT is a vector of values (i.e. values representative of the voltage values) representing the amplitude of the vibration in the container walls, ordered in terms of vibration frequency. This vector is referred to as the frequency spectrum of the signal. To facilitate handling of the very large number of values, the values in the frequency spectrum are summarized for frequency intervals, so-called frequency bins. For convenience, a frequency bin for the described frequency range may correspond to a frequency interval of about 10 Hz giving 2000 frequency bins for a frequency sweep from 0 Hz to 20 kHz.

Thereby, a multi dimensional acoustic spectrum is acquired where each frequency bin can be considered to represent one dimension. A more detailed description of acoustic spectroscopy can be found in U.S. Pat. No. 9,772, 311, and will therefore not be discussed in further detail in the present disclosure.

A key feature of the described method lies in the compression, i.e. dimensionality reduction, of the acquired acoustic spectrums in search for useful information and the subsequent clustering. An example method will be described where principal component analysis (PCA) is used as the mathematical dimensionality reduction method, although other dimensionality reduction methods or a combination of them may also be used.

As introduced above, multidimensional information is derived from the frequency spectrum where each bin represents a frequency band and where each bin is a vector representation of the properties of the corresponding frequency band. Applying PCA can be seen as "turning" the vectors to reduce the dimensionality of the spectrum while maintaining as much information as possible. The result of the PCA analysis can be seen as a PCA-space where the dimensionality of the PCA space is determined by parameters of the PCA method. In the present description, it is assumed that the PCA-space comprises predetermined clusters. However, if a new process is being analyzed, or if other parameters have been changed so that the known clusters are incorrect, a clustering method may be applied to the PCA-space to automatically generate clusters in the PCA-space dimensionality. The clustering, i.e. classification, may be performed in many different ways. Clustering may for example be fully automated, supervised, semi-supervised or be performed manually, depending on the requirements and complexity of the application at hand. Examples of clustering methods include DBSCAN, Ward-clustering and support vector machine (SVM) models.

In principle clustering of all the different measured material states from a given process could be done using any given clustering algorithm. It is however desirable that the clustering method fulfils the following requirements:
The clustering algorithm can discover the number of clusters present in the data set.
The clustering algorithm can be run on-line to feed new data points.
The clustering algorithm has large scalability.
The clustering algorithm can handle different cluster sizes.
The clustering algorithm can handle different cluster shapes (non-flat geometry).

Moreover, the required clustering algorithms may be provided in the acoustic spectroscopy system such that clustering can be performed in an offline-environment. However, it is also possible to perform the clustering remotely in applications where the acoustic spectroscopy system is connected to a remote resource, e.g. via an internet connection, a cloud environment or other remote connection means.

Figure 3:
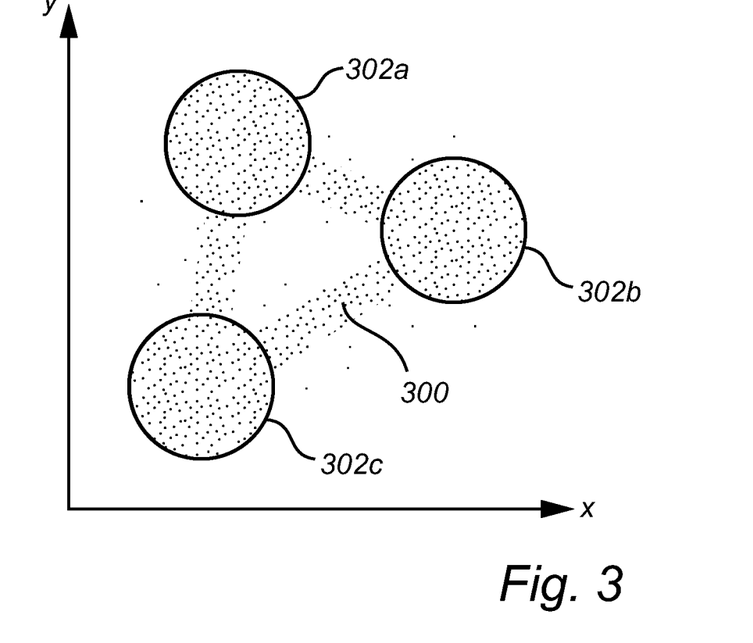
FIG. 3 is a graph schematically illustrating an example application of the method according to an embodiment of the invention.

FIG. 3 is a graph schematically illustrating a plurality of material states 300 determined by the described method. The material states are here illustrated as two-dimensional states to simplify illustration. However, the dimensionality of the material states may in principle be decided arbitrarily based on what is required or desirable for a certain application. FIG. 3 further illustrates three material state clusters 302a-c and it can be seen that some of the material states fall within the clusters and some are outside of the material state clusters. Material states outside of the material state clusters 302a-c may be regarded as undefined material states. It is however desirable to define the clusters in a way so that as many as possible of the determined material states belong to a cluster. It is also possible to define groups of clusters to aid a process operator or a process control method.

The method may further comprise determining an optimal path between two different and separate predetermined material state clusters. In an application where the different material state clusters represent different stages or qualities of a process, it may be advantageous to know and monitor the path between material state clusters so that a change between clusters can be performed in the most efficient manner and so that it can be monitored that the process in moving towards the desired cluster.

Figure 4:
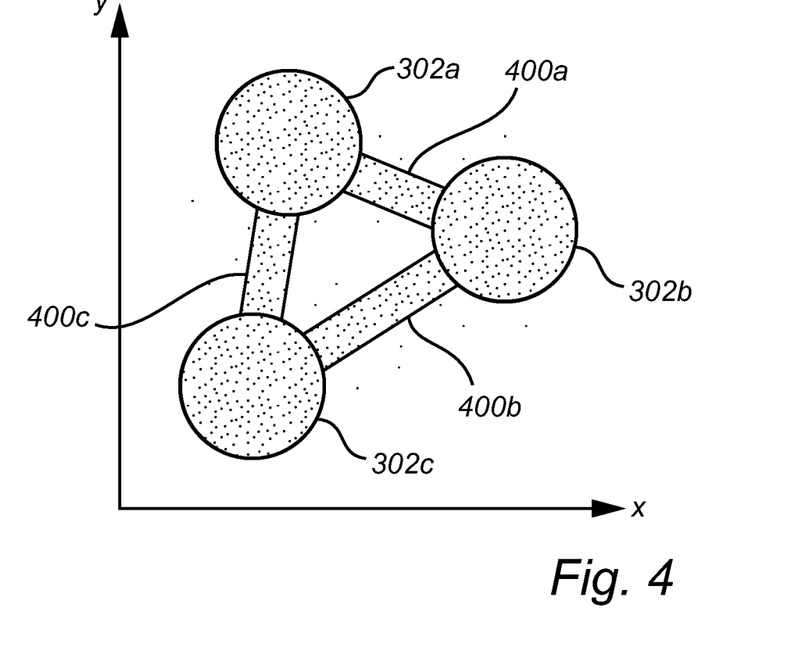
FIG. 4 is a graph schematically illustrating an example application of the method according to an embodiment of the invention.

FIG. 4 schematically illustrates different material state clusters 302a-c and optimal paths 400a-c between the different clusters 302a-c. In FIG. 4, the optimal paths are for simplicity illustrated as straight lines, or corridors, between the different clusters 302a-c. However, the paths may take on other shapes, and the shape of an optimized path between clusters my also be determined based on the properties of the monitored process.

By defining the paths between clusters, it is also possible to determine if any given material state is located on a path between two predetermined material state clusters, thereby making it possible to determine if observed changes in material states are indicative of a change of e.g. process quality.

It is also possible to use control parameters of the process to anticipate if the material states will move from one cluster to another. Accordingly, where a certain set of process control parameters are assumed to result in a given cluster, the material or process can be monitored to ensure that the predicted cluster is actually reached.

Figure 5:
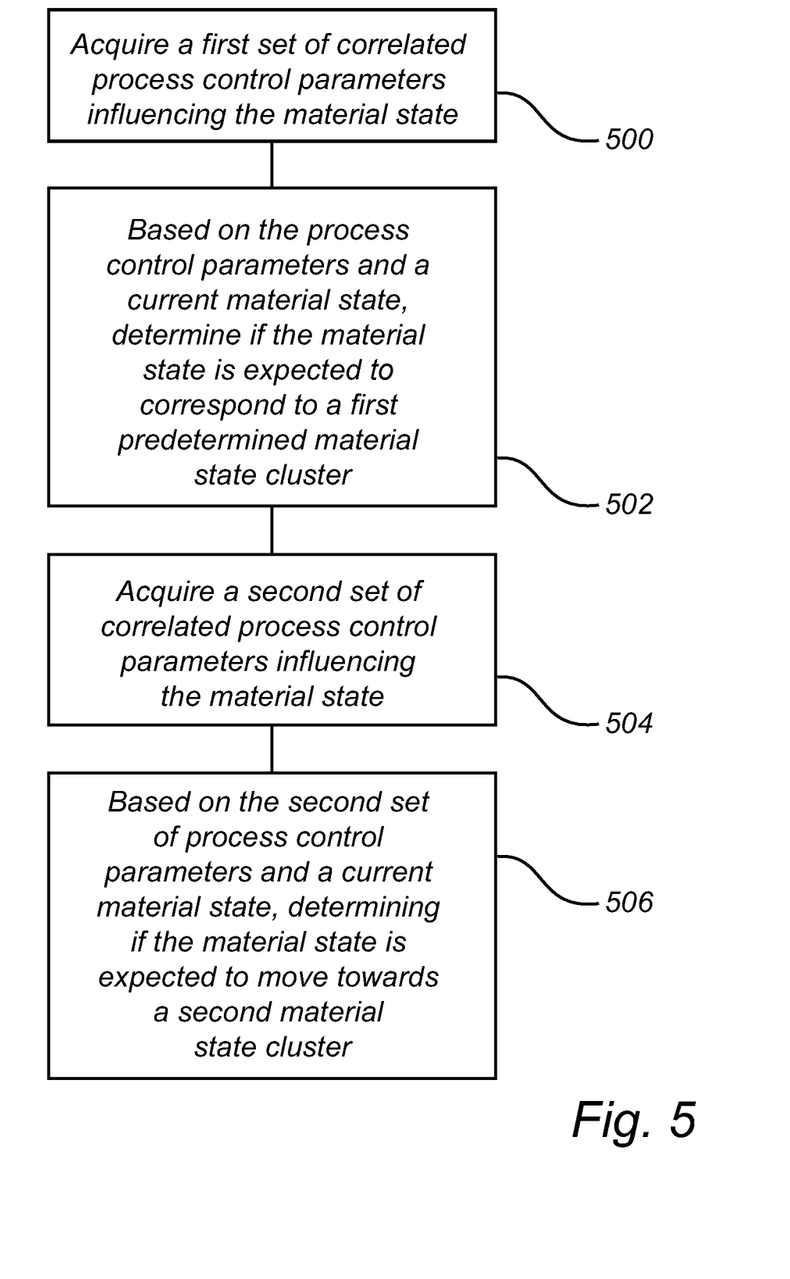
FIG. 5 is a flow chart outlining the general steps of a method according to an embodiment of the invention.

FIG. 5 is a flow chart outlining steps of an example embodiment of the method. The method comprises acquiring 500 a first set of correlated process control parameters influencing the material state; based on the process control parameters and a current material state, determining 502 if the material state is expected to move towards a first predetermined material state cluster, acquiring 504 a second set of correlated process control parameters influencing the material state; and based on the second set of process control parameters and a current material state, determining 506 if the material state is expected to move towards a second predetermined material state cluster, different from the first predetermined material state cluster.

Figure 6:
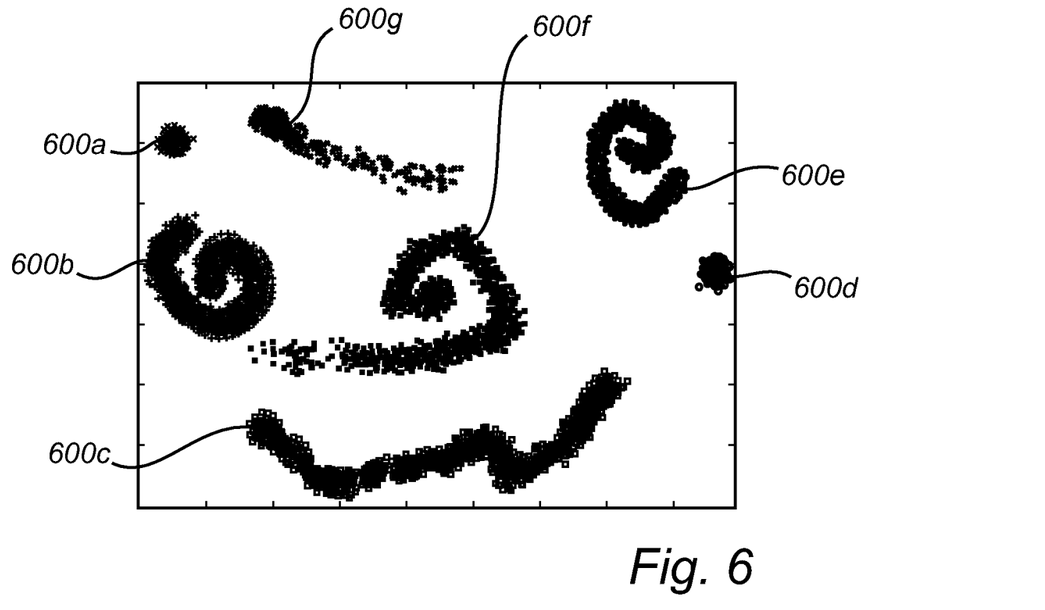
FIG. 6 is a graph schematically illustrating an example application of the method according to an embodiment of the invention.

FIG. 6 schematically illustrates various possible shapes of material state clusters 600a-g in a two-dimensional representation, thereby showing that clusters may have many different shapes and sizes.

Figure 7:
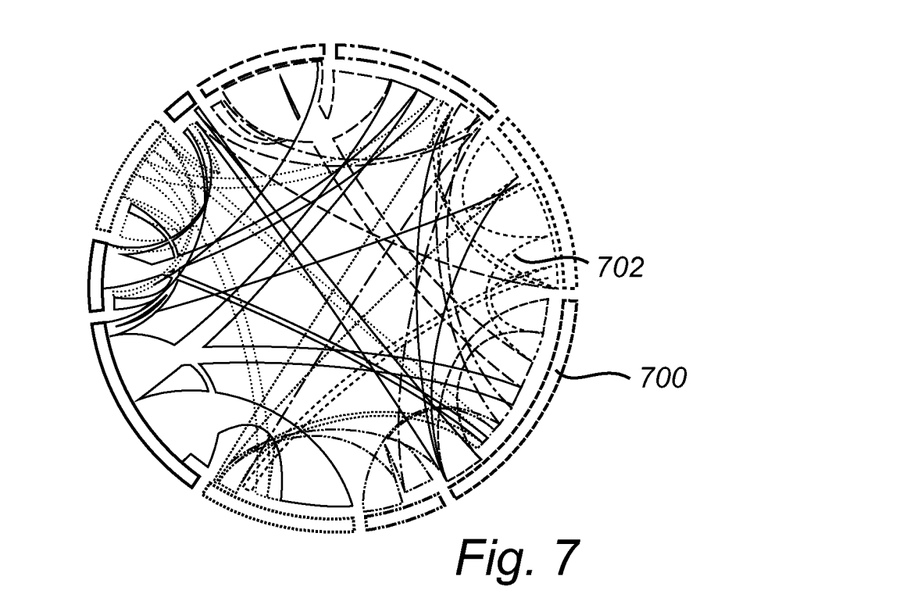
FIG. 7 is a graph schematically illustrating an example application of the method according to an embodiment of the invention.

FIG. 7 schematically illustrates an alternative representation of material states where each circle section 700 represents a material state cluster, and where possible paths 702 between clusters are illustrated. The described representation can for example be used in a graphical user interface where each state is related to a corresponding set of process parameters, and where a change in process parameters may change the displayed path from one state to another.

Even though the invention has been described with reference to specific exemplifying embodiments thereof, many different alterations, modifications and the like will become apparent for those skilled in the art. Also, it should be noted that parts of the system and method may be omitted, interchanged or arranged in various ways, the system and method yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for determining material properties in an active acoustic spectroscopy system comprising an acoustic transmitter arranged to emit an acoustic signal into a material in a container and an acoustic receiver arranged to receive the acoustic signal having been affected by the material, the method comprising:
  acquiring a multidimensional acoustic spectrum from a material in a container using the acoustic spectroscopy system;
  reducing the dimensionality of the acoustic spectrum using a mathematical dimensionality reduction method, thereby forming a reduced acoustic spectrum describing a material state;
  determining if the material state belongs to a predetermined material state cluster; and
  determining an optimal path between two different and separate predetermined material state clusters.

2. The method according to claim 1, further comprising:
  defining a plurality of predetermined clusters based on a plurality of material states using a machine learning method.

3. The method according to claim 1, wherein the mathematical dimensionality reduction method is selected from the group comprising: principal component analysis, wavelet transformation, neural networks, isomap and multidimensional scaling.

4. The method according to claim 3, wherein the mathematical dimensionality reduction method to be used is selected based on a quality measure of a resulting material state resulting from a respective mathematical dimensionality reduction method.

5. The method according to claim 4, wherein the quality measure is based on at least one of:
  a distance between data points representing material states;
  a radius of a resulting cluster; and
  number of data points within a certain radius.

6. The method according to claim 1, wherein the reduced acoustic spectrum is a two-dimensional data point.

7. The method according to claim 1, wherein determining an optimal path between two different and separate predetermined material state clusters comprises optimizing a path based on an estimated time required to transition from a first material state cluster to a second material state cluster.

8. The method according to claim 1, wherein determining an optimal path between two different and separate predetermined material state clusters comprises optimizing a path based on an estimated energy required to transition from a first material state cluster to a second material state cluster.

9. A method for determining material properties in an active acoustic spectroscopy system comprising an acoustic transmitter arranged to emit an acoustic signal into a material in a container and an acoustic receiver arranged to receive the acoustic signal having been affected by the material, the method comprising:
  acquiring a multidimensional acoustic spectrum from a material in a container using the acoustic spectroscopy system;
  reducing the dimensionality of the acoustic spectrum using a mathematical dimensionality reduction method, thereby forming a reduced acoustic spectrum describing a material state;
  determining if the material state belongs to a predetermined material state cluster;
  determining that a process is transitioning from a first material state cluster to a second material state cluster;
  determining a transition velocity for the process; and
  comparing the determined transition velocity with a predetermined estimated transition velocity from a first material state to a second material state.

10. The method according to claim 1, wherein if the material state does not belong to a predetermined material state cluster, the method further comprises determining if the material state is located on a path between two predetermined material state clusters.

11. The method according to claim 1, further comprising:
  acquiring a first set of correlated process control parameters influencing a material state; and
  based on the process control parameters and a current material state, determining if the material state is expected to move towards a first predetermined material state cluster.

12. The method according to claim 1, further comprising:
  acquiring a first set of correlated process control parameters influencing the material state;
  based on the process control parameters and a current material state, determining if the material state is expected correspond to a first predetermined material state cluster;
  acquiring a second set of correlated process control parameters influencing the material state; and
  based on the second set of process control parameters and a current material state, determining if the material state is expected to move towards a second predetermined material state cluster, different from the first predetermined material state cluster.

13. The method according to claim 1, wherein if the material state does not belong to a predetermined material state cluster, the method further comprises determining that the material state is an undefined material state.

14. The method according to claim 1, further comprising, if a predetermined number of consecutively determined material states are located within one and the same predetermined material state cluster, determining that the monitored process is in a steady state.

15. The method according to claim 1, further comprising, if a material is not within a selected cluster, estimating a time to reach the selected material state cluster based on a plurality of previously determined material states.

16. The method according to claim 1, further comprising:
based on a plurality of reduced acoustic spectrums describing a plurality of material states, defining at least one material state cluster from the plurality of reduced acoustic spectrums.

17. An active acoustic spectroscopy system comprising:
an acoustic transmitter arranged to emit an acoustic signal into a material in a container;
an acoustic receiver arranged to receive the acoustic signal having been affected by the material; and
a control unit connected to each of the acoustic transmitter and the acoustic receiver, the control unit being configured to:
acquire a multidimensional acoustic spectrum from a material in a container using acoustic spectroscopy;
reduce the dimensionality of the acoustic spectrum using a mathematical dimensionality reduction method to form a reduced acoustic spectrum describing a material state;
determine if the material state belongs to a predetermined material state cluster; and
determine an optimal path between two different and separate predetermined material state clusters.

18. The method according to claim 9, further comprising determining an optimal path between two different and separate predetermined material state clusters.

19. The active acoustic spectroscopy system according to claim 17, wherein determining an optimal path between two different and separate predetermined material state clusters comprises optimizing a path based on an estimated time required to transition from a first material state cluster to a second material state cluster.

20. The active acoustic spectroscopy system according to claim 17, wherein determining an optimal path between two different and separate predetermined material state clusters comprises optimizing a path based on an estimated energy required to transition from a first material state cluster to a second material state cluster.

* * * * *